Figure 1:
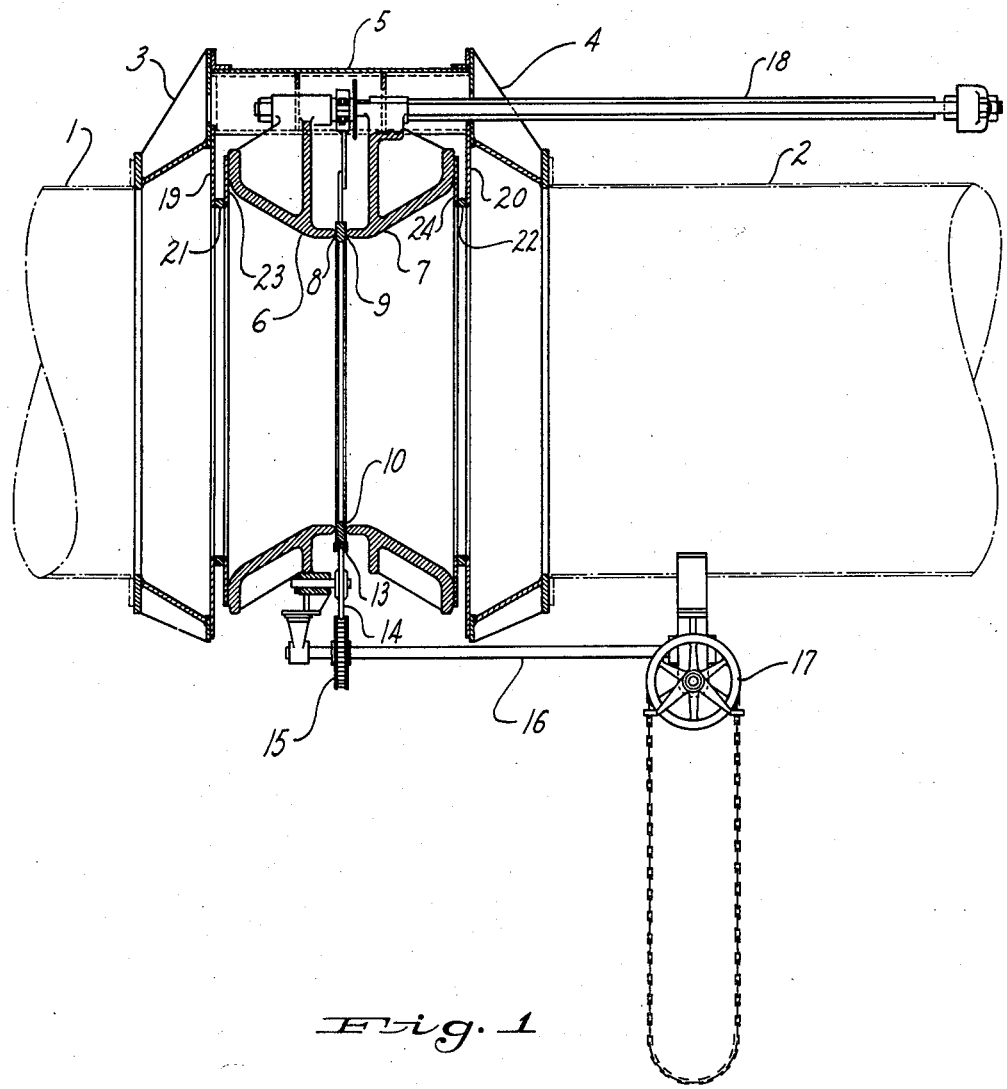

United States Patent Office 2,864,407
Patented Dec. 16, 1958

2,864,407

PNEUMATICALLY SEALED GOGGLE VALVES

Andrew Bowland, Pittsburgh, Pa.

Application May 11, 1956, Serial No. 584,304

3 Claims. (Cl. 138—94.5)

This invention relates to new and useful improvements in goggle valves for high pressure furnaces and more particularly to goggle valves installed in mains conducting hot and dirty gases on high top pressure furnaces where it is exceedingly difficult to rely upon the goggle valve to remain tight.

It is among the objects of the invention to provide a goggle valve structure in which the valve is suspended, as it were, in a stress relieving cage.

It is another object of the invention to provide a goggle valve structure in which the valve housing flanges connected to the gas main are provided with expansion joints on both sides of the valve rings to free the latter from distortion stresses and in which the flanges are connected by heavy structural members.

It is yet another object of the invention to provide a goggle valve structure in which the valve rings between which the goggle plate operates, are mounted or suspended by annular flexible sheet plates that are themselves mounted on annular flexible sheet members of the housing flanges.

Figure 2:
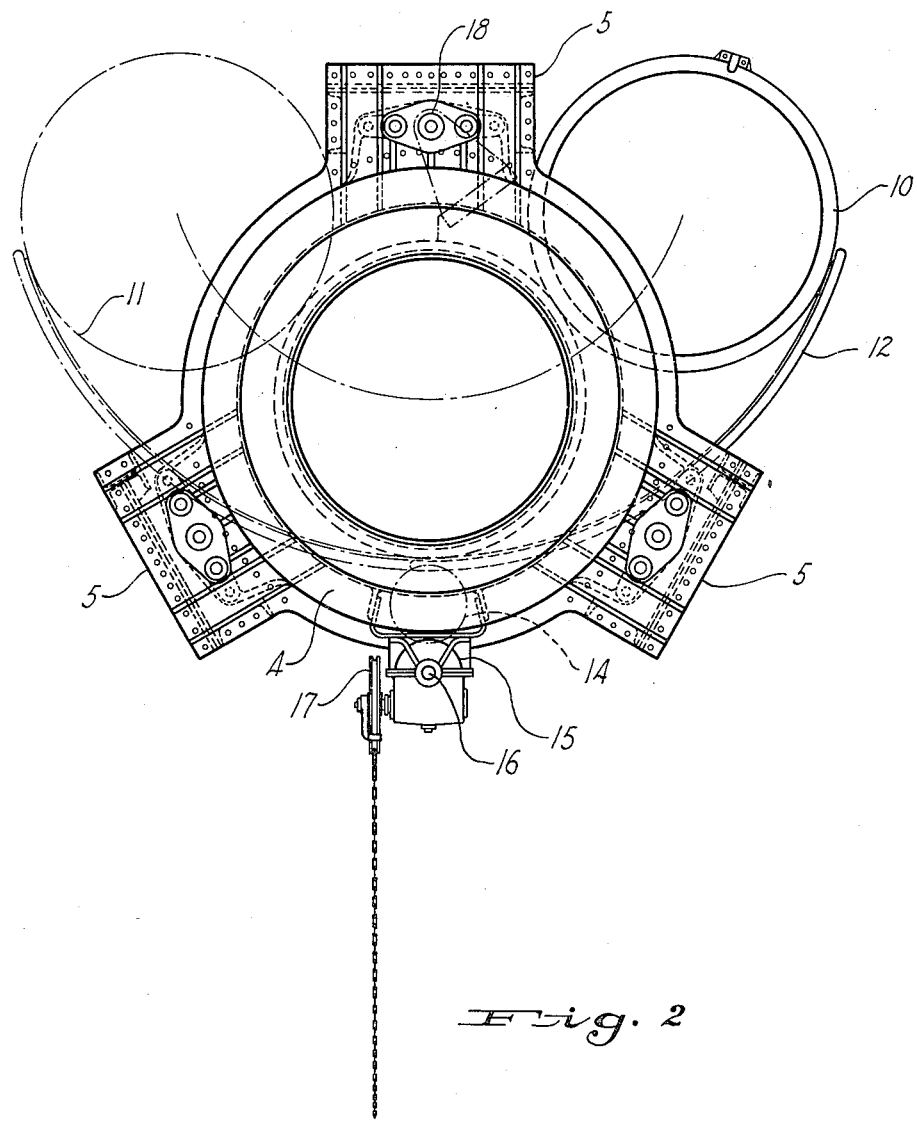

These and other objects of the invention will become more apparent from a consideration of the accompanying drawing constituting a part hereof in which like reference characters designate like parts, and in which:

Fig. 1 is a vertical cross-sectional view, partially in elevation, of a goggle valve structure embodying the principles of this invention; and, Fig. 2, an end elevational view thereof.

With reference to the several figures of the drawing, the numerals 1 and 2 designate hot gas mains for conducting extremely hot and dirty gases from furnaces. The numerals 3 and 4 generally designate cage rings connected to the mains 1 and 2, which, together with the cage ring connectors 5 and thermal tubes constitute a suspension cage for the valve proper.

The valve consists of valve rings 6 and 7 having reduced ends 8 and 9 that constitute the valve seat for engaging the ring valve 10, which, as shown in Fig. 2, is in the form of a pair of goggles, so called, one of which is the ring 10 and the other a solid disc 11 connected by a curved structural member 12 that constitutes a track, having teeth 13 engaged by gear wheel 14, meshing with a wheel 15 mounted on shaft 16 having a wheel engaged by a worm operated by a chain pulley 17, which constitutes no part of the present invention. The valve suspension cage must provide suitable clearance for operation of the goggle valve, for which purpose it is an open structure between the connecting brackets 5, spaced 120°, as shown in Fig. 2.

The cage rings 3 and 4 are connected by heavy structural members 5 to firmly secure them as an integral structure. The valve rings 6 and 7 are mounted for expansion and contraction on tubes 18 as shown and described in Bailey Patent No. 1,947,453 granted February 20, 1934, which tubes are connected to communicate with a source of steam and cooling fluid and when steam is supplied, the expanding tube will cause valve rings 6 and 7 to separate to permit operation of the goggle valve 10 to set it to the open or closed position, as the case may be. When the valve has been set, a cooling fluid is passed through the tubes 18 causing them to contract and restore the seating of the valve rings 6 and 7 on the opposite faces of the goggle valve 10, the thermal expansion feature, including the expansion tubes 18, being no part of the present invention.

The cage rings 3 and 4 are, in effect, integrally formed with the mains 1 and 2 and are provided with annular steel plates 19 and 20 by which they are connected through rings 21 and 22 to annular steel plates 23 and 24 that carry the annular valve rings 6 and 7 to which they are attached as by bolts. By virtue of this construction and the connecting structural members 5, the valve rings 6 and 7 and the associated goggle valve 10 are relieved of the stress and strains imposed by displacement of the valve mounts and are thereby capable of maintaining an absolute sealed joint.

Due to the variance in temperature of the gases in the mains, the connecting cage rings may be subject to distortion and are free to move, as for example by expanding on one side and contracting on the opposite side without disturbing the valve rings 6 and 7, or the goggle valve 10, because of the flexibility of the connecting annular steel plates 19, 20, 23 and 24. Because of this ability of permitting distortion or displacement of the mains or connecting flanges, the construction may be termed a stress relieving valve cage.

The reduction in the diameter of the goggle valve opening which as viewed in the drawing, is shown to be smaller than the diameter of the mains 1 and 2. This is desirable to provide sufficient clearance for the goggle valve between the connectors 5, as shown in Figure 2 of the drawing, and is possible due to the fact that a restriction in the flow passage between the high pressure gas mains would not interfere with the free flow of the high pressure gases.

The above type of valve may be used for blast furnace gas washer and boiler plant gas mains where high temperature, high pressure dirty gases flow through the mains while maintaining a tight, sealed joint provided by the stress relieving cage construction. By employing the thermal expansion and contraction mechanism, the clamping force of the valve rings is applied equally at all points around the periphery of the valve discs, assuring tight seal which is not broken by any distortion of the valve cage connections with the mains due to the ability of the connecting annular steel plates to align themselves without applying distorting stresses to the valve per se.

A feature of the invention is the construction of the flanges and valve brackets integrally with the gas mains to provide a stress relieving cage for the operating valve and the reduction in the valve opening to provide sufficient operating clearance for the goggle valve between the angularly spaced connecting brackets.

Although one embodiment of the invention has been herein illustrated and described, it will be evident to those skilled in the art that various modifications may be made in the details of construction without departing from the principles herein set forth.

I claim:

1. In a goggle valve structure, a pair of juxtaposed cage rings joined to the ends of a gas main, angularly spaced connectors bridging said cage rings and integrally joined therewith to form a suspension cage, a pair of valve rings in said cage having spaced parallel flexible annular steel plates connected to said valve rings and to said cage rings to be suspended thereby, and a goggle valve movably mounted between said valve rings.

2. In a goggle valve structure a pair of juxtaposed cage rings joined to the ends of a gas main, angularly spaced connectors for mounting thermal expansion tubes bridging said cage rings and integrally joined therewith to form a suspension cage, a pair of valve rings in said cage having spaced parallel flexible annular steel plates connected thereto and to said cage rings, one of said valve rings being mounted for movement by said expansion tubes and a goggle valve movably mounted between said valve rings.

3. In a goggle valve structure, a pair of juxtaposed cage rings joined to the ends of a gas main, angularly spaced connectors for mounting thermal expansion tubes bridging said cage rings and integrally joined therewith to form a suspension cage, a pair of valve rings in said cage having parallel flexible annular steel plates connected thereto and to said cage rings to be suspended thereby, one of said valve rings being mounted for movement by said expansion tubes, and a goggle valve movably mounted between said valve rings, said valve rings being of smaller diameter than the cage ring openings.

References Cited in the file of this patent

UNITED STATES PATENTS

| | | |
|---|---|---|
| 1,947,453 | Bailey | Feb. 20, 1934 |
| 2,011,767 | Juengling | Aug. 20, 1935 |
| 2,661,770 | Hookham | Dec. 8, 1953 |